US012640893B2

(12) United States Patent
Lei et al.

(10) Patent No.: US 12,640,893 B2
(45) Date of Patent: May 26, 2026

(54) METHOD AND APPARATUS FOR DOWNLINK AND UPLINK TRANSMISSIONS OVER AN UNLICENSED SPECTRUM

(71) Applicant: Lenovo (Beijing) Limited, Beijing (CN)

(72) Inventors: Haipeng Lei, Beijing (CN); Yu Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 367 days.

(21) Appl. No.: 18/248,555

(22) PCT Filed: Oct. 15, 2020

(86) PCT No.: PCT/CN2020/121161
§ 371 (c)(1),
(2) Date: Apr. 11, 2023

(87) PCT Pub. No.: WO2022/077339
PCT Pub. Date: Apr. 21, 2022

(65) Prior Publication Data
US 2023/0388088 A1     Nov. 30, 2023

(51) Int. Cl.
*H04W 4/00*      (2018.01)
*H04L 5/00*      (2006.01)
*H04W 72/0446*   (2023.01)
*H04W 72/232*    (2023.01)

(52) U.S. Cl.
CPC ....... *H04L 5/0092* (2013.01); *H04W 72/0446* (2013.01); *H04W 72/232* (2023.01)

(58) Field of Classification Search
None
See application file for complete search history.

(56) References Cited

U.S. PATENT DOCUMENTS 12,238,732 B2 *  2/2025  Wu ..................... H04W 74/006
2024/0163894 A1 *  5/2024  Xiong .................. H04L 1/1854

FOREIGN PATENT DOCUMENTS

CN      103687017 A      3/2014
CN      110474754 A      11/2019
(Continued)

OTHER PUBLICATIONS

Mediatek Inc. , "Discussion on NR-U configured grant", 3GPP TSG RAN WG1 #96bis , R1-1904485, Xi'an, China [retrieved May 21, 2023]. Retrieved from the Internet <https://www.3gpp.org/ftp/TSG_RAN/WG1_RL1/TSGR1_96b/Docs/>., Apr. 2019, 6 Pages.
(Continued)

*Primary Examiner* — Zewdu A Beyen
(74) *Attorney, Agent, or Firm* — FIG. 1 Patents

(57)     ABSTRACT

Embodiments of the present disclosure relate to methods and apparatuses for downlink and uplink transmission over an unlicensed spectrum. According to some embodiments of the disclosure, a method for wireless communications may include: determining a transport block (TB) to be transmitted on a plurality of consecutive slots; determining a set of candidate starting positions for transmitting the TB; and performing a channel access procedure for a candidate starting position from the set of candidate starting positions.

20 Claims, 8 Drawing Sheets

(56)　　　　　　References Cited

FOREIGN PATENT DOCUMENTS

| CN | 110832930 A | 2/2020 |
| WO | 2017077388 A1 | 5/2017 |

OTHER PUBLICATIONS

PCT/CN2020/121161 , "International Preliminary Report on Patentability", US Application No. PCT/CN2020/121161, Apr. 27, 2023, 5 pages.

PCT/CN2020/121161 , "International Search Report and Written Opinion", PCT Application No. PCT/CN2020/121161, Jul. 16, 2021, 6 pages.

* cited by examiner

413

513

600 determining a TB to be transmitted on a plurality of consecutive slots — 611 determining a set of candidate starting positions for transmitting the TB — 613 performing a channel access procedure for a candidate starting position from the set of candidate starting positions — 615

700 determining a TB to be received on a plurality of consecutive slots — 711 determining a set of candidate starting positions for receiving the TB — 713 receiving the TB from a candidate starting position of the set of candidate starting positions — 715

METHOD AND APPARATUS FOR DOWNLINK AND UPLINK TRANSMISSIONS OVER AN UNLICENSED SPECTRUM

TECHNICAL FIELD

Embodiments of the present disclosure generally relate to wireless communication technology, and more particularly to downlink (DL) and uplink (UL) transmissions over an unlicensed spectrum.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In a wireless communication system, a user equipment (UE) or a base station (BS) may operate in both a licensed spectrum and an unlicensed spectrum. For a transmission on an unlicensed spectrum, in order to achieve fair coexistence between wireless systems, a channel access procedure (e.g., a listen-before-talk (LBT) procedure) may be required before transmission on the unlicensed spectrum.

There is a need for handling downlink (DL) and uplink (UL) transmission over an unlicensed spectrum.

SUMMARY

Some embodiments of the present disclosure provide a method for wireless communications. The method may be performed by a user equipment (UE) or a base station (BS). The method may include: determining a transport block (TB) to be transmitted on a plurality of consecutive slots; determining a set of candidate starting positions for transmitting the TB; and performing a channel access procedure for a candidate starting position from the set of candidate starting positions.

Some embodiments of the present disclosure provide a method for wireless communications. The method may be performed by a user equipment (UE) or a base station (BS). The method may include: determining a transport block (TB) to be received on a plurality of consecutive slots; determining a set of candidate starting positions for receiving the TB; and receiving the TB from a candidate starting position of the set of candidate starting positions.

In some embodiments of the present disclosure, the method may further include transmitting a downlink control information (DCI) format for scheduling the TB on the plurality of consecutive slots. In some embodiments of the present disclosure, the method may further include receiving a DCI format for scheduling the TB on the plurality of consecutive slots.

In some embodiments of the present disclosure, the number of candidate starting positions in the set of candidate starting positions may be equal to the number of slots of the plurality of consecutive slots. In some examples, a first candidate starting position of the set of candidate starting positions may correspond to the first scheduled symbol of a first slot of the plurality of consecutive slots, and the remaining candidate starting positions of the set of candidate starting positions may correspond to the first symbols of the remaining slots of the plurality of consecutive slots.

In some embodiments of the present disclosure, the TB may include a plurality of code blocks (CBs), and each of the plurality of consecutive slots may include an integer number of CBs of the plurality of CBs and an approximately equal number of CBs of the plurality of CBs. Each of X slots of the plurality of consecutive slots may include B CBs and each of Y slots of the plurality of consecutive slots may include A CBs; and wherein X=mod(C,N), Y=N−X, $$A = \left\lfloor \frac{C}{N} \right\rfloor, B = \left\lceil \frac{C}{N} \right\rceil,$$

N denotes the number of slots of the plurality of consecutive slots, and C denotes the number of CBs in the TB.

In some examples, the X slots may be the first X slots of the plurality of consecutive slots and the Y slots may be the last Y slots of the plurality of consecutive slots. In some other examples, the Y slots may be the first Y slots of the plurality of consecutive slots and the X slots may be the last X slots of the plurality of consecutive slots. In yet other examples, the Y slots may be the first Y−1 slots of the plurality of consecutive slots and the last slot of the plurality of consecutive slots, and the X slots may be the remaining slots of the plurality of consecutive slots.

In yet other examples, the plurality of CBs may be mapped to the plurality of consecutive slots based on a time domain resource allocation (TDRA) indicator in the DCI format. In response to the first slot of the plurality of consecutive slots being not fully scheduled and the remaining slots of the plurality of consecutive slots being fully scheduled, the Y slots may be the first Y slots of the plurality of consecutive slots and the X slots may be the last X slots of the plurality of consecutive slots. In response to the last slot of the plurality of consecutive slots being not fully scheduled and the remaining slots of the plurality of consecutive slots being fully scheduled, the X slots may be the first X slots of the plurality of consecutive slots and the Y slots may be the last Y slots of the plurality of consecutive slots. In response to both the first slot and the last slot of the plurality of consecutive slots being not fully scheduled, the Y slots may be the first Y−1 slots of the plurality of consecutive slots and the last slot of the plurality of consecutive slots, and the X slots may be the remaining slots of the plurality of consecutive slots. In response to all of the plurality of consecutive slots being fully scheduled, the X slots may be the first X slots of the plurality of consecutive slots and the Y slots may be the last Y slots of the plurality of consecutive slots, or the Y slots may be the first Y slots of the plurality of consecutive slots and the X slots may be the last X slots of the plurality of consecutive slots, or the Y slots may be the first Y−1 slots of the plurality of consecutive slots and the last slot of the plurality of consecutive slots, and the X slots may be the remaining slots of the plurality of consecutive slots.

In some embodiments of the present disclosure, when the number of slots of the plurality of consecutive slots is greater than the number of slots available for reception from the candidate starting position, only the CBs of the TB mapped to the first one or more slots of the plurality of consecutive slots are received. In some other embodiments of the present disclosure, when the number of slots of the plurality of consecutive slots is greater than the number of slots available for reception from the candidate starting position, only the CBs of the TB mapped to the last one or more slots of the plurality of consecutive slots are received.

In some embodiments of the present disclosure, all the CBs included in the same slot may be grouped as a code block group (CBG). The DCI format may include a bitmap to indicate the CBGs to be transmitted or retransmitted, and each bit of the bitmap may correspond to a respective CBG. The number of bits of the bitmap may be equal to the maximum number of slots scheduled by the DCI format.

In some embodiments of the present disclosure, each of the plurality of consecutive slots may include an integer number of code block groups (CBGs), and the maximum number of CBGs per TB may be configured by radio resource control (RRC) signaling or predefined.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
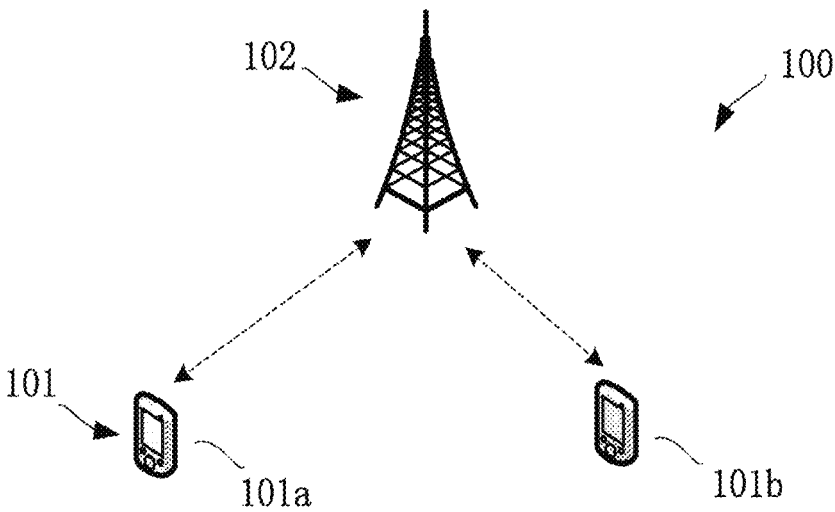
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs and BS s may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS s 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an OFDM modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

NR Release 17 will expand the frequency range to 71 GHz. Due to the phase noise effect at a high frequency band, higher subcarrier spacing (SCS) may be specified for the purpose of reliability. For example, 240 kHz SCS, 480 kHz SCS, 960 kHz SCS, and even 1920 kHz SCS may be considered. It is known that the higher the SCS, the shorter the duration of a slot. For example, Table 1 below shows exemplary slot durations for different SCS. It should be understood that Table 1 is only for illustrative purposes, and should not be construed as limiting the embodiments of the present disclosure.

TABLE 1

| | Slot durations for different SCS | |
|---|---|---|
| μ | $\Delta f = 2^\mu \cdot 15$ [kHz] | Slot duration |
| 0 | 15 | 1 ms |
| 1 | 30 | 0.5 ms |
| 2 | 60 | 0.25 ms |
| 3 | 120 | 0.125 ms |
| 4 | 240 | 0.0625 ms |
| 5 | 480 | 31.25 μs |
| 6 | 960 | 15.625 μs |

In the above Table 1, the SCS configuration, μ is associated with the SCS (listed in the second column of Table 1). For example, "μ=4" may indicate a SCS of 240 kHz, and the slot duration for such SCS is 0.0625 ms.

As shown in above Table 1, the duration of a single slot for, for example, 240 kHz SCS, 480 kHz SCS or 960 kHz SCS is quite short. It would be beneficial to allow a single DCI format to schedule multiple slots when a relatively high SCS is applied. For example, the transmission of a single transport block (TB) on a single PUSCH or PDSCH occupying multiple slots may be allowed. The potential benefits include, but are not limited to, the following: (1) UE power consumption reduction because there may be no need to monitor the physical downlink control channel (PDCCH) in every slot; (2) keeping the existing maximum number of HARQ processes for the UE's soft buffer size maintenance; (3) saving the cyclic redundancy check (CRC) overhead of the TB compared to scheduling multiple TBs on multiple slots; and (4) not increasing the UE's processing capability requirements in the slot level.

Figure 2:
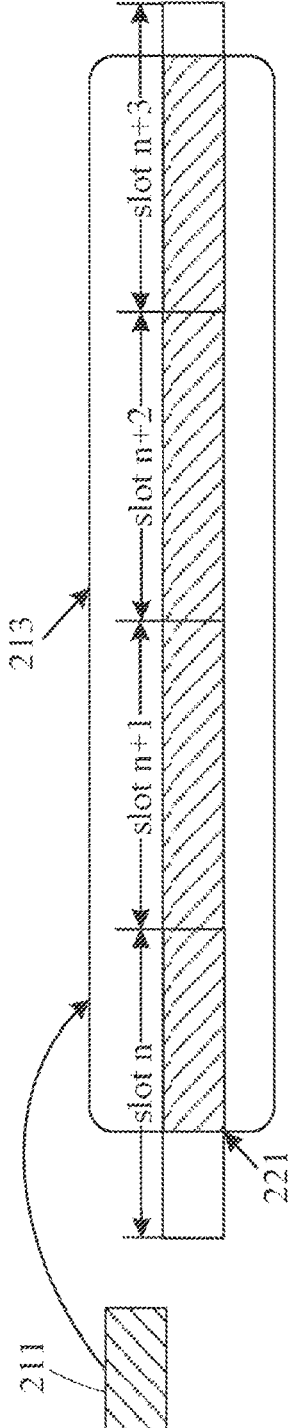
FIG. 2 illustrates a schematic diagram of a DCI format scheduling a DL or UL transmission(s) in accordance with some embodiments of the present disclosure.

FIG. 2 illustrates a schematic diagram of a DCI format scheduling a DL or UL transmission(s) in accordance with some embodiments of the present disclosure. It should be understood that FIG. 2 is only for illustrative purposes, and should not be construed as limiting the embodiments of the present disclosure.

As shown in FIG. 2, DCI format 211 may schedule TB 213 on multiple slots (e.g., slot n to slot n+3). The TB 213 may be carried on a PDSCH or a PUSCH. In this way, a single HARQ process is needed for the multiple slots (e.g., slot n to slot n+3). In some embodiments, DCI format 211 may only schedule one PDSCH or PUSCH, which carries at least TB 213. For example, the PDSCH or PUSCH may only carry TB 213. Or the PDSCH or PUSCH may carry TB 213 and another TB (not shown in FIG. 2) immediately following TB 213. In some other embodiments, DCI format 211 may schedule more than one PDSCH or PUSCH, each of which may carry at least one TB. For example, DCI format 211 may schedule two PDSCHs, the first PDSCH carries TB 213 and the second PDSCH (not shown in FIG. 2) carries another TB (not shown in FIG. 2) immediately following TB 213.

Although in FIG. 2, the first slot and the last slot (e.g., slot n and slot n+3) of the multiple slots are not fully scheduled (e.g., the first scheduled symbol of slot n starts at symbol 221), it is contemplated that in some embodiments of the present disclosure, the first slot, the last slot, or both may be fully scheduled. For example, the first scheduled symbol in the first scheduled slot (e.g., slot n) may be the first symbol (e.g., symbol 0) in this slot.

Over the 60 GHz spectrum, there are several GHz bandwidths allocated for unlicensed purpose. For a transmission on an unlicensed spectrum, in order to achieve fair coexistence between wireless systems (e.g., NR system access on unlicensed spectrum (NR-U) systems and other wireless systems), a channel access procedure, also known as a listen-before-talk (LBT) test or LBT procedure, may be performed before communicating on the unlicensed spectrum.

The channel access procedure may be performed based on sensing (or energy detection) that evaluates the availability of a channel for performing transmissions. The basic unit for sensing is a sensing slot. In some examples, the sensing slot may have the duration of $T_{sl}=9$ us. When a BS or a UE senses a channel during a sensing slot duration $T_{sl}$, and determines that the detected energy for at least a certain period of time (e.g., 4 us) within the sensing slot duration is less than an energy detection threshold ($X_{Thresh}$), the sensing slot duration $T_{sl}$ may be considered as idle and so the channel may be deemed as empty or clear or available in the sensing slot. Otherwise, the sensing slot duration $T_{sl}$ may be considered as busy, and so the channel may be deemed as occupied or non-available in the sensing slot. For a transmission on an unlicensed spectrum, when a PUSCH or PDSCH is assigned from, for example, symbol x of slot n and the channel access procedure before symbol x fails, the PUSCH or PDSCH has to be abandoned or dropped.

When the above-mentioned multi-slot scheduling feature, i.e., a single DCI format scheduling a PDSCH or PUSCH (e.g., one PDSCH or one PUSCH) for transmitting a TB (e.g., one) on a plurality of consecutive slots, is supported over the unlicensed spectrum, in the case that the channel access procedure fails for the starting symbol of the PDSCH or PUSCH, according to the current NR-U (NR system access on unlicensed spectrum) framework, the PDSCH or PUSCH has to be dropped. In this scenario, the plurality of consecutive slots is wasted, even when the channel may be available after a while. For example, the channel may be available in the second scheduled slot (e.g., slot n+1). Therefore, it would be beneficial to provide a plurality of candidate starting positions for the PDSCH or PUSCH transmission over a plurality of consecutive slots on the unlicensed spectrum so as to avoid resource waste and to lower transmission latency.

On the other hand, the implementation complexity for both the BS and UE may be quite high when a plurality of PDSCHs/PUSCHs are prepared before performing channel access procedures corresponding to the plurality of candidate starting positions in the scheduled slots and a corresponding prepared PDSCH or PUSCH is selected based on the outcome of the channel access procedures. As a result, a single PDSCH or PUSCH may be prepared before performing channel access procedures and may be transmitted from the nearest candidate starting position in response to a successful channel access procedure.

In this way, the scheduled TB is transmitted based on the outcome of the channel access procedures and some data may be punctured. However, one problem is how to let the receiving party know which part of the TB is transmitted and which part of the TB is punctured. Meanwhile, if a certain portion of the TB is successfully received, the receiving party may be supposed to transmit corresponding feedback (e.g., hybrid automatic repeat request acknowledgement (HARQ-ACK) feedback) to indicate to the transmitter that the portion of the TB has been successfully received and does not need to be retransmitted. By this means, the transmitter only needs to retransmit the data which has not been successfully received so as to improve retransmission efficiency. However, this would require a finer HARQ-ACK feedback mechanism between the receiving party and the transmitting party.

Embodiments of present disclosure provide solutions to enhance DL and UL transmissions over an unlicensed spectrum. The disclosed solutions are especially advantageous when high SCS is applied and can solve at least the above-mentioned problems. For example, code block (CB) mapping schemes and code block group (CBG) based HARQ-ACK feedback mechanisms are disclosed to solve the above problems. More details on the embodiments of the present disclosure will be illustrated in the following text in combination with the appended drawings.

In some embodiments of the present disclosure, for a single TB scheduled by a single DCI format to be transmitted, for example, on a single PDSCH or PUSCH, on a plurality of consecutive slots, one or more candidate transmission opportunities may be supported when the PDSCH or PUSCH is transmitted over an unlicensed spectrum.

Assuming that the PDSCH or PUSCH is scheduled on N consecutive slots, there may be N candidate starting positions for the scheduled PDSCH or PUSCH. The first candidate starting position among the N candidate starting positions corresponds to the first scheduled symbol of the first slot (e.g., symbol 221 of slot n in FIG. 2) of the N scheduled slots, and the remaining N−1 candidate starting positions corresponds to the first symbol (e.g., symbol 0) of each of the remaining N−1 scheduled slots. The channel access procedure may be performed from the first candidate starting position to a next until a successful channel access procedure has been obtained or all candidate starting positions have been tried.

In response to a successful channel access procedure for a specific candidate starting position, the transmitting party (e.g., a UE or a BS) may deem the slots from the slot corresponding to the specific candidate starting position to the last scheduled slot as available slots, and may transmit the PDSCH or PUSCH on the available slots. When the channel access procedures for all candidate starting positions fail, the transmitting party may abandon or drop the PDSCH or PUSCH transmission. For example, referring back to FIG. 2, when a channel access procedure for symbol 221 of slot n fails and a channel access procedure for symbol 0 of slot n+1 succeeds, the transmitting party may start the transmission of the PDSCH or PUSCH from symbol 0 of slot n+1. In this example, slots n+1 to n+3 may be referred to as available slots.

In some embodiments of the present disclosure, the scheduled TB may be mapped to all the slots scheduled by the DCI format. Each slot of the scheduled slots may include an integer number of code blocks (CBs). In other words, the resource mapping for each CB of the scheduled TB is within a single slot and not across the slot boundary. Rate matching may be performed within each of the scheduled slots so as to guarantee that an integer number of CBs is included in a slot. In some examples, the number of CBs in each slot of the scheduled slots may be the same. In some other examples, the number of CBs in each slot of the scheduled slots may be different, for example, considering that the first scheduled slot, the last scheduled slot, or both may be not fully occupied by the TB.

The following text shows some mapping schemes from CBs of a TB to the assigned slots of the TB according to some embodiments of the present disclosure. In these CB mapping schemes, as a principle, an integer number of CBs is mapped to each of the scheduled slots and an approximately equal number of CBs is mapped to each of the scheduled slots.

Assuming that a DCI schedules a TB on N consecutive slots (denoted as slot n, n+1, . . . , n+N−1) and the scheduled TB includes C CBs (denoted as $CB_0$, $CB_1$, . . . , $CB_{C-1}$), a UE or a BS may first calculate X, Y, A and B according to the below equations:

$$X = \mathrm{mod}(C, N) \tag{1}$$

$$Y = N - X \tag{2}$$

$$A = \left\lfloor \frac{C}{N} \right\rfloor \tag{3}$$

$$B = \left\lceil \frac{C}{N} \right\rceil \tag{4}$$

Within the N scheduled slots, the C CBs can be mapped according to the following mapping schemes:

Mapping scheme A1: the C CBs are mapped in increasing order of slot index from the first slot (e.g., slot n) to the last slot (e.g., slot n+N−1) of the scheduled slots according to the following methods.

Each of the first X slots includes B CBs. For example,
Slot n includes $CB_0$, $CB_1$, . . . , $CB_{B-1}$,
Slot n+1 includes $CB_B$, $CB_{B+1}$, . . . , $CB_{2B-1}$,
. . . , and
Slot n+X−1 includes $CB_{(X-1)B}$, $CB_{(X-1)B+1}$, . . . , $CB_{XB-1}$.
Each of the last Y slots includes A CBs. For example, Slot n+X includes $CB_{XB}$, $CB_{XB+1}$, . . . , $CB_{XB+A-1}$, Slot n+X+1 includes $CB_{XB+A}$, $CB_{XB+A+1}$, . . . , $CB_{XB+2A-1}$, . . . , and slot n+N−1 includes $CB_{XB+(N-X-1)A}$, $CB_{XB+(N-X-1)A+1}$, . . . , $CB_{XB+(N-X)A-1}$.

In this way, an approximately equal number of CBs is mapped to each of the scheduled slots. For example, the difference between the values of B and A is not greater than 1.

Figure 3:
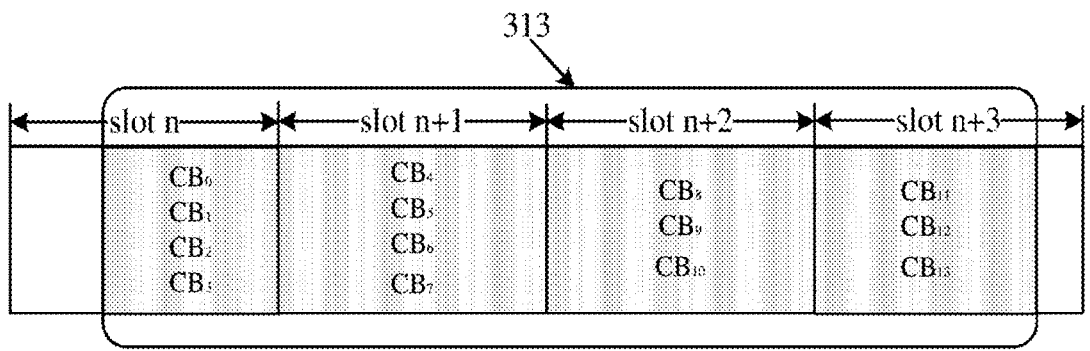
FIG. 3 illustrates an example code block mapping scheme in accordance with some embodiments of the present disclosure.

FIG. 3 illustrates an example code block mapping scheme in accordance with some embodiments of the present disclosure. It should be understood that FIG. 3 is only for illustrative purposes, and should not be construed as limiting the embodiments of the present disclosure.

As shown in FIG. 3, a DCI format (not shown) may schedule TB 313 on multiple slots (e.g., slot n to slot n+3). Assuming that TB 313 includes 14 CBs (denoted as $CB_0$ to $CB_{13}$,), then in the example of FIG. 3, N=4, C=14. According to equations (1)-(4), X=2, Y=2, A=3, B=4. According to mapping scheme A1, each of the first X slots of slots n to n+3 includes B CBs and each of the last Y slots includes A CBs. As shown in FIG. 3, the first slot, i.e., slot n, includes $CB_0$, $CB_1$, $CB_2$, and $CB_3$; the second slot, i.e., slot n+1, includes $CB_4$, $CB_5$, $CB_6$, and $CB_7$; the third slot, i.e., slot n+2, includes $CB_8$, $CB_9$, and $CB_{10}$; and the fourth slot, i.e., slot n+3, includes $CB_{11}$, $CB_{12}$, and $CB_{13}$.

Mapping scheme A2: the C CBs are mapped in increasing order of slot index from the first slot (e.g., slot n) to the last slot (e.g., slot n+N−1) of the scheduled slots according to the following methods.

Each of the first Y slots includes A CBs. For example,

Slot n includes $CB_0$, $CB_1$, . . . , $CB_{A-1}$,

Slot n+1 includes $CB_A$, $CB_{A+1}$, $CB_{2A-1}$,

. . . ,

Slot n+Y−1 includes $CB_{(Y-1)A}$, $CB_{(Y-1)A+1}$, . . . , $CB_{YA-1}$.

Each of the last X slots includes A CBs. For example,

Slot n+Y includes $CB_{YA}$, $CB_{YA+1}$, . . . , $CB_{YA+B-1}$,

Slot n+Y+1 includes $CB_{YA+B}$, $CB_{YA+B+1}$, . . . , $CB_{YA+2B-1}$,

. . . , slot n+N−1 includes $CB_{YA+(N-Y-1)B}$, $CB_{YA+(N-Y-1)B+1}$, . . . , $CB_{YA+(N-Y)B-1}$.

In this way, an approximately equal number of CBs is mapped to each of the scheduled slots. For example, the difference between the values of B and A is not greater than 1.

Figure 4:
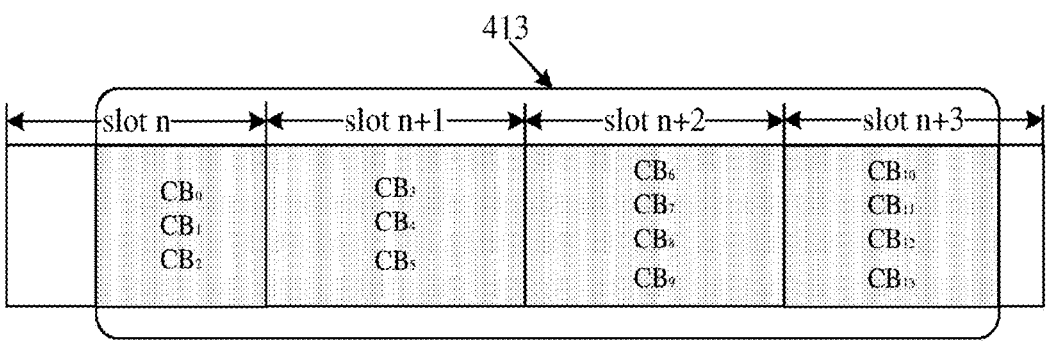
FIG. 4 illustrates an example code block mapping scheme in accordance with some embodiments of the present disclosure.

FIG. 4 illustrates an example code block mapping scheme in accordance with some embodiments of the present disclosure. It should be understood that FIG. 4 is only for illustrative purposes, and should not be construed as limiting the embodiments of the present disclosure.

As shown in FIG. 4, a DCI format (not shown) may schedule TB 413 on multiple slots (e.g., slot n to slot n+3). Assuming that TB 413 includes 14 CBs (denoted as $CB_0$ to $CB_{13}$,), then in the example of FIG. 4, N=4, C=14. According to equations (1)-(4), X=2, Y=2, A=3, B=4. According to mapping scheme A2, each of the first Y slots of slots n to n+3 includes A CBs and each of the last X slots includes B CBs. As shown in FIG. 4, the first slot, i.e., slot n, includes $CB_0$, $CB_1$, and $CB_2$; the second slot, i.e., slot n+1, includes $CB_3$, $CB_4$, and $CB_5$; the third slot, i.e., slot n+2, includes $CB_6$, $CB_7$, $CB_8$, and $CB_9$; and the fourth slot, i.e., slot n+3, includes $CB_{10}$, $CB_{11}$, $CB_{12}$, and $CB_{13}$.

Mapping scheme A3: the C CBs are allocated according to the following methods.

The last scheduled slot includes the last A CBs. For example,

Slot n+N−1 includes $CB_{C-A}$, $CB_{C-A+1}$, . . . , $CB_{C-1}$.

Each of the first Y−1 slots includes A CBs. For example,

Slot n includes $CB_0$, $CB_1$, . . . , $CB_{A-1}$,

Slot n+1 includes $CB_A$, $CB_{A+1}$, . . . , $CB_{2A-1}$,

. . . ,

Slot n+Y−2 includes $CB_{(Y-2)A}$, $CB_{(Y-2)A+1}$, . . . , $CB_{(Y-1)A-1}$.

Each of the last X slots includes A CBs. For example,

Slot n+Y−1 includes $CB_{(Y-1)A}$, $CB_{(Y-1)A+1}$, . . . , $CB_{(Y-1)A+B-1}$,

Slot n+Y includes $CB_{(Y-1)A+B}$, $CB_{(Y-1)A+B+1}$, . . . , $CB_{(Y-1)A+2B-1}$, Slot n+Y+1 includes $CB_{(Y-1)A+2B}$, $CB_{(Y-1)A+2B+1}$, . . . , $CB_{(Y-1)A+3B-1}$,

. . . , slot n+Y+X−2 includes $CB_{(Y-1)A+(X-1)B}$, $CB_{(Y-1)A+(X-1)B+1}$, . . . , $CB_{(Y-1)A+XB-1}$.

It is advantageous to employ mapping scheme A3 to scenarios such as when both the first slot and the last slot of the scheduled slots are not fully scheduled since it makes sense to allocate less CBs to a partial slot and more CBs to a full slot. In this sense, mapping scheme A3 may have many variations, as long as the first and the last slot of the scheduled slots include A CBs. For example, the first slot may include A CBs, and the second to $(X+1)^{th}$ slots may include B CBs, and the remaining Y−1 slots may include A CBs.

In this way, an approximately equal number of CBs is mapped to each of the scheduled slots. For example, the difference between the values of B and A is not greater than 1.

Figure 5:
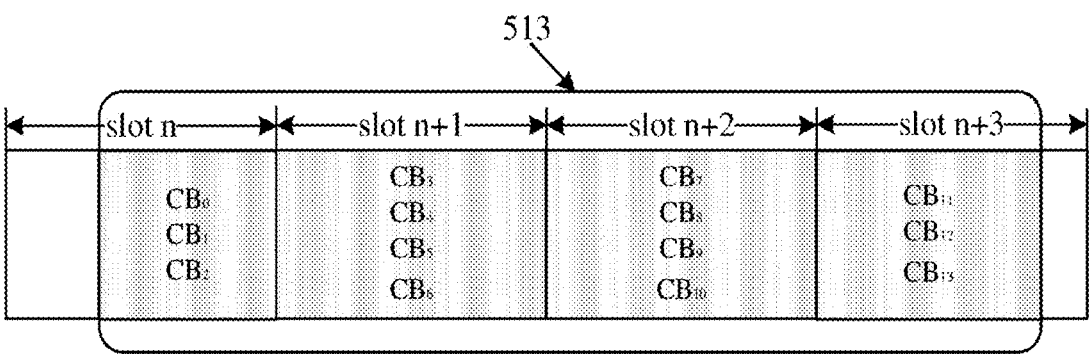
FIG. 5 illustrates an example code block mapping scheme in accordance with some embodiments of the present disclosure.

FIG. 5 illustrates an example code block mapping scheme in accordance with some embodiments of the present disclosure. It should be understood that FIG. 5 is only for illustrative purposes, and should not be construed as limiting the embodiments of the present disclosure.

As shown in FIG. 5, a DCI format (not shown) may schedule TB 513 on multiple slots (e.g., slot n to slot n+3). Assuming that TB 513 includes 14 CBs (denoted as $CB_0$ to $CB_{13}$,), then in the example of FIG. 5, N=4, C=14. According to equations (1)-(4), X=2, Y=2, A=3, B=4. According to mapping scheme A3, as shown in FIG. 5, the first slot, i.e., slot n, includes $CB_0$, $CB_1$, and $CB_2$; the second slot, i.e., slot n+1, includes $CB_3$, $CB_4$ and $CB_5$, and $CB_6$; the third slot, i.e., slot n+2, includes $CB_7$, $CB_8$, $CB_9$, and $CB_{10}$; and the fourth slot, i.e., slot n+3, includes $CB_{11}$, $CB_{12}$, and $CB_{13}$.

Mapping scheme A4: the C CBs may be dynamically allocated. For example, the DCI format which schedules the TB may indicate the mapping scheme to be employed. In some embodiments, the DCI format may include a time domain resource allocation (TDRA) indicator indicating the mapping scheme to be employed.

In some examples, when the first slot of the scheduled slots is not fully scheduled and the remaining slots of the scheduled slots are fully scheduled, the CBs of the TB may be allocated according to mapping scheme A2. In some examples, when the last slot of the scheduled slots is not fully scheduled and the remaining slots of the scheduled slots are fully scheduled, the CBs of the TB may be allocated according to mapping scheme A1. In some examples, when both the first and the last slot of the scheduled slots are not fully scheduled, the CBs of the TB may be allocated according to mapping scheme A3. In some examples, when all of the scheduled slots are fully scheduled, the CBs of the TB may be allocated according to one of mapping schemes A1, A2, and A3.

In this way, an approximately equal number of CBs is mapped to each of the scheduled slots and more CBs are included in full slots compared to partial slots (if any).

As mentioned above, based on the outcome of the channel access procedure, the transmission of the TB may be started from a specific candidate starting position with successful channel access procedure. Assuming that the channel access procedure succeeds in a specific slot (e.g., slot m, where the slot index m is in reference to the first slot (e.g., slot n) of the N scheduled slots and thus 0<=m<=N−1), the remaining N-m slots in the N scheduled slots are available for transmission.

In some embodiments of the present disclosure, the CBs mapped to the first m slots of the N scheduled slots may be dropped and the CBs mapped to the last N-m slots of the N scheduled slots may be transmitted from slot m to slot N−1 within the N scheduled slots, respectively.

In some other embodiments of the present disclosure, the CBs mapped to the first N-m slots of the N scheduled slots are transmitted from slot m to slot N−1 within the N scheduled slots, respectively, and the CBs mapped to the last m slots of the N scheduled slots are dropped.

CBG-based retransmission may be employed. Several CBG construction methods may be applied.

For example, in some embodiments of the present disclosure, all the CBs of the TB scheduled by a DCI format included in the same slot are grouped as one CBG. In this way, the number of CBGs of the scheduled TB is equal to the number of scheduled slots.

In these embodiments, for DL transmission, CBG-based HARQ-ACK feedback may be employed. In other words, each of the scheduled slots can be acknowledged by a respective HARQ-ACK information bit corresponding to all the CBs included in the corresponding scheduled slot. From the UE's perspective, as long as all the CBs of a scheduled slot are successfully decoded, an acknowledgement (ACK) corresponding to the slot is generated in the HARQ-ACK codebook. Otherwise, a negative acknowledgement (NACK) is generated in the HARQ-ACK codebook. From the BS's perspective, in response to reception of the HARQ-ACK codebook, if a scheduled slot is acknowledged with "ACK", the BS would assume that all the CBs in this slot are not necessary for retransmission. Otherwise, if a scheduled slot is acknowledged with "NACK", the BS would assume that all the CBs in this slot are required for retransmission.

In some examples, a bitmap in the DCI format scheduling retransmission of the PDSCH may indicate the transmitted or retransmitted CBGs. Each bit of the bitmap corresponds to a respective CBG in a respective slot. For example, bit "1" may indicate that the CBs or CBG in a corresponding slot are to be transmitted or retransmitted; bit "0" may indicate that the CBs or CBG in a corresponding slot are not retransmitted; or vice versa. The size of the bitmap may be equal to the maximum number of slots that can be scheduled by a DCI format. For example, the number of bits of the bitmap may be equal to the maximum number of slots scheduled by a DCI format. The bitmap in a DCI format scheduling an initial transmission of a PDSCH may indicate that all the CBGs of the TB are transmitted on the scheduled slots. For example, each bit of the bitmap may be set to "1," which indicates that all the CBGs of the TB are transmitted. The DCI format may further include a new data indicator (NDI) to indicate whether the TB is associated with an initial transmission or retransmission. When the NDI in the DCI format is toggled (e.g., the NDI bit is changed compared to the previous NDI bit for a new TB), the UE can neglect the bitmap. Otherwise, if the NDI is not toggled (e.g., the NDI bit is unchanged compared to the previous NDI bit for the same TB), the UE may check the bitmap to determine the retransmitted CBGs.

For UL transmission, a bitmap in the DCI format scheduling retransmission of the PUSCH may indicate the CBGs need to be retransmitted by the UE. Each bit of the bitmap corresponds to a respective CBG in a respective slot. For example, bit "1" may indicate that a corresponding CBG needs to be transmitted or retransmitted, and bit "0" may indicate that a corresponding CBG need not to be retransmitted; or vice versa. From the UE's perspective, in response to the reception of such bitmap, if a CBG in a slot is indicated as "1", the UE shall retransmit all the CBs in this CBG in the scheduled resource; otherwise, the UE shall not retransmit any CBs in this CBG.

In some other embodiments of the present disclosure, the maximum number of CBGs per TB may be configured by radio resource control (RRC) signaling or predefined, for example, in standards. Denoting the maximum number of CBGs per TB as M, the TB scheduled by a DCI format may be partitioned into maximum M CBGs. Each of the slots scheduled by a DCI format for transmitting the TB may include an integer number of CBGs with rate matching performed in each slot. Different CBGs may include the same or different numbers of CBs. In some examples, the number of CBGs in each of the scheduled slots may be the same. The number of CBGs in each of the scheduled slots may be different, for example, considering that the first scheduled slot, the last scheduled slot, or both may not be fully occupied by the TB.

Figure 6:
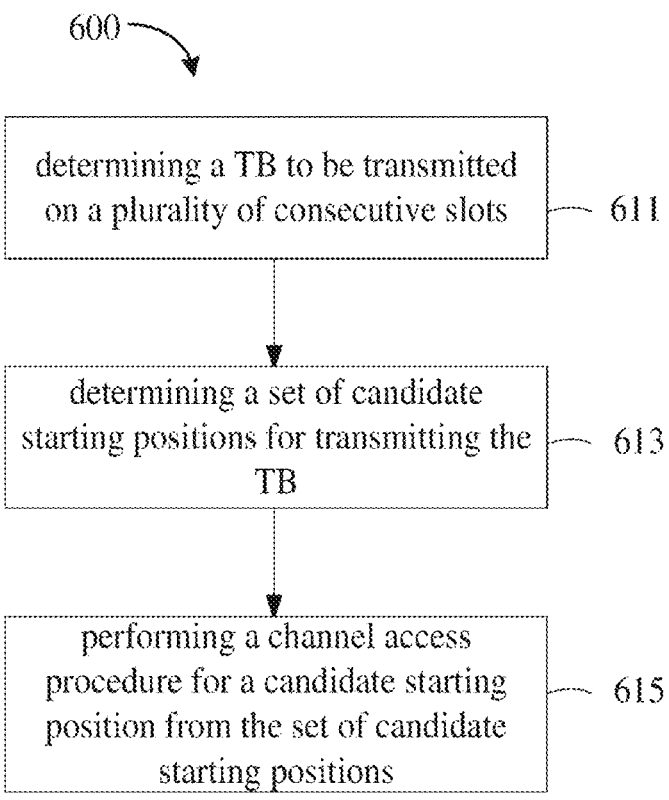
FIG. 6 illustrates a flow chart of an exemplary procedure of wireless communications in accordance with some embodiments of the present disclosure.

FIG. 6 illustrates a flow chart of an exemplary procedure 600 for wireless communications in accordance with some embodiments of the present disclosure. Details described in all of the foregoing embodiments of the present disclosure are applicable for the embodiments shown in FIG. 6. In some examples, the procedure may be performed by a UE, for example, UE 101 in FIG. 1. In some other examples, the procedure may be performed by a BS, for example, BS 102 in FIG. 1.

Referring to FIG. 6, in operation 611, a transmitting party (e.g., a UE or a BS) may determine a TB to be transmitted on a plurality of consecutive slots. In some examples, the transmitting party may be a UE. For instance, the UE may receive a DCI format for scheduling the TB on the plurality of consecutive slots. The TB may be carried on a PUSCH. In some other examples, the transmitting party may be a BS. For instance, the BS may transmit a DCI format for scheduling the TB on the plurality of consecutive slots. The TB may be carried on a PDSCH.

The TB may include a plurality of CBs, which may be mapped to the plurality of consecutive slots. In some embodiments of the present disclosure, each of the plurality of consecutive slots may include an integer number of CBs of the plurality of CBs and an approximately equal number of CBs of the plurality of CBs. The transmitting party may apply a CB mapping scheme to satisfy the above requirements. For example, mapping schemes A1-A4 as described above may apply here.

In some embodiments, assuming that the number of slots of the plurality of consecutive slots is N and the number of CBs in the TB is C, the transmitting party may determine the values of X, Y, A and B according to above-mentioned equations (1)-(4). Each of X slots of the plurality of consecutive slots may include B CBs and each of Y slots of the plurality of consecutive slots may include A CBs.

In some examples, when mapping scheme A1 is applied, the X slots may be the first X slots of the plurality of consecutive slots and the Y slots may be the last Y slots of the plurality of consecutive slots. In some examples, when mapping scheme A2 is applied, the Y slots may be the first Y slots of the plurality of consecutive slots and the X slots may be the last X slots of the plurality of consecutive slots. In some examples, when mapping scheme A3 is applied, the Y slots may be the first Y−1 slots of the plurality of consecutive slots and the last slot of the plurality of consecutive slots, and the X slots may be the remaining slots of the plurality of consecutive slots.

In some examples, when mapping scheme A4 is applied, the plurality of CBs of the scheduled TB may thus be mapped to the plurality of consecutive slots in a dynamic manner. For instance, the DCI format may indicate the mapping scheme (e.g., one of mapping schemes A1-A4) to be applied, for example, via a TDRA indicator.

For example, in response to the first slot of the plurality of consecutive slots being not fully scheduled and the remaining slots of the plurality of consecutive slots being fully scheduled, mapping scheme A2 may be applied. That is, the Y slots may be the first Y slots of the plurality of consecutive slots and the X slots may be the last X slots of the plurality of consecutive slots. In response to the last slot of the plurality of consecutive slots being not fully scheduled and the remaining slots of the plurality of consecutive slots being fully scheduled, mapping scheme A1 may be applied. That is, the X slots may be the first X slots of the plurality of consecutive slots and the Y slots may be the last Y slots of the plurality of consecutive slots. In response to both the first slot and the last slot of the plurality of consecutive slots being not fully scheduled, mapping scheme A3 may be applied. That is, the Y slots may be the first Y−1 slots of the plurality of consecutive slots and the last slot of the plurality of consecutive slots, and the X slots may be the remaining slots of the plurality of consecutive slots. In response to all of the plurality of consecutive slots being fully scheduled, any of the mapping schemes A1 to A3 may be applied. That is, the X slots may be the first X slots of the plurality of consecutive slots and the Y slots may be the last Y slots of the plurality of consecutive slots. Or the Y slots may be the first Y slots of the plurality of consecutive slots and the X slots may be the last X slots of the plurality of consecutive slots. Or the Y slots may be the first Y−1 slots of the plurality of consecutive slots and the last slot of the plurality of consecutive slots, and the X slots may be the remaining slots of the plurality of consecutive slots.

In operation 613, the transmitting party may determine a set of candidate starting positions for transmitting the TB. In some embodiments, the number of candidate starting positions in the set of candidate starting positions may be equal to the number of slots of the plurality of consecutive slots. For example, a first candidate starting position of the set of candidate starting positions may correspond to the first scheduled symbol (e.g., symbol 221 in FIG. 2) of a first slot of the plurality of consecutive slots, and the remaining candidate starting positions of the set of candidate starting positions may correspond to the first symbols (e.g., symbol 0) of the remaining slots of the plurality of consecutive slots.

In operation 615, the transmitting party may perform a channel access procedure for a candidate starting position from the set of candidate starting positions. In response to the channel access procedure being successful, the transmitting party may transmit the TB on available slots of the plurality of consecutive slots. In some embodiments, when the number of slots of the plurality of consecutive slots is greater than the number of available slots, only the CBs of the TB mapped to the first one or more slots of the plurality of consecutive slots are transmitted. In some other embodiments, when the number of slots of the plurality of consecutive slots is greater than the number of available slots, only the CBs of the TB mapped to the last one or more slots of the plurality of consecutive slots are transmitted.

For example, referring back to FIG. 2, the transmitting party may determine a set of candidate starting positions for transmitting TB 213. The set of candidate starting positions may include four candidate starting positions corresponding to symbol 221 in slot n, symbol 0 in slot n+1, symbol 0 in slot n+2, symbol 0 in slot n+2, respectively. The transmitting party may first perform a channel access procedure for a first candidate starting position corresponding to symbol 221 in slot n. In the case that the channel access procedure is successful, the transmitting party may deem slots from slot n to slot n+3 as available, and may start the transmission of TB 213 from symbol 221 in slot n. In this case, since the number of slots of the plurality of consecutive slots is equal to the number of available slots (i.e., both are equal to 4), all CBs of the TB are transmitted.

In the case that the channel access procedure for the first candidate starting position fails, the transmitting party may perform another channel access procedure for a second candidate starting position corresponding to symbol 0 in slot n+1. In the case that the another channel access procedure is successful, the transmitting party may deem slots from slot n+1 to slot n+3 as available, and may start the transmission of TB 213 on the available slots. In this case, since the number of slots of the plurality of consecutive slots (i.e., 4) is greater than the number of available slots (i.e., 3), some CBs of the TB may be dropped. Although the CBs of the TB are mapped to the four consecutive slots (e.g., slot n to slot n+3), in some examples, only the CBs of the TB mapped to the first three slots are transmitted, and the CBs of the TB mapped to the last slot (e.g., slot n+3) are dropped. In some other examples, only the CBs of the TB mapped to the last three slots are transmitted, and the CBs of the TB mapped to the first slots (e.g., slot n) are dropped.

Similarly, in the case the another channel access procedure fails, the transmitting party may perform yet another channel access procedure for a next candidate starting position (e.g., the one corresponding to symbol 0 in slot n+2) until a successful channel access procedure has been obtained or all candidate starting positions have been tried. In the case that the channel access procedures for all candidate starting positions fail, the transmitting party may abandon or drop the transmission.

In some embodiments of the present disclosure, a CBG-based retransmission may be employed. As described above, different CBG construction methods may be applied. In some examples, all the CBs of the scheduled TB included in the same slot are grouped as a CBG. The DCI format may include a bitmap to indicate the CBGs to be transmitted or retransmitted, and each bit of the bitmap may correspond to a respective CBG. The number of bits of the bitmap may be equal to the maximum number of slots scheduled by a DCI format. For instance, referring back to FIG. 2, the CBs of TB 213 mapped to slot n are grouped as a CBG, the CBs of TB 213 mapped to slot n+1 are grouped as another CBG, and so on. DCI format 211 may include a bitmap having 4 bits, each corresponding to a respective CBG. The bitmap may indicate the CBGs of TB 213 to be transmitted or retransmitted.

For example, in the case that the TB is carried by a PDSCH, for an initial transmission, the bitmap in the DCI format generated by the transmitting party (e.g., a BS) may indicate that all the CBGs of the TB are transmitted on the scheduled slots. In response to receiving the TB, the receiving party (e.g., a UE) may generate a HARQ-ACK codebook including HARQ-ACK feedback corresponding to each CBG (or each scheduled slot) of the TB. For example, when the UE successfully decodes all the CBs of a scheduled slot, the UE may generate an ACK corresponding to the slot in the HARQ-ACK codebook. Otherwise, the UE may generate a NACK corresponding to the slot in the HARQ-ACK codebook. In response to receiving the HARQ-ACK codebook, the BS may determine the CBGs that are required for retransmission and generate a bitmap in a DCI format indicating the CBGs of the TB to be retransmitted to the UE, if necessary. In the case that a bit in the bitmap indicates a retransmission, the UE should retransmit all CBs in the corresponding CBG (or slot). In the case that the TB is carried by a PUSCH, the bitmap in the DCI format may indicate the CBGs need to be transmitted or retransmitted by the transmitting party (e.g., a UE).

In some other examples, the CBG construction may be based on the maximum number of CBGs per TB, which may be configured by RRC signaling or is predefined. For example, in the case that the procedure 600 is performed by a UE, the UE may receive, from a BS, an RRC signaling message indicating the maximum number of CBGs per TB. In the case that the procedure 600 is performed by a BS, the BS may transmit, to a UE, an RRC signaling message indicating the maximum number of CBGs per TB. In some examples, the maximum number of CBGs per TB may be predefined. Each of the plurality of consecutive slots may include an integer number of CBGs.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
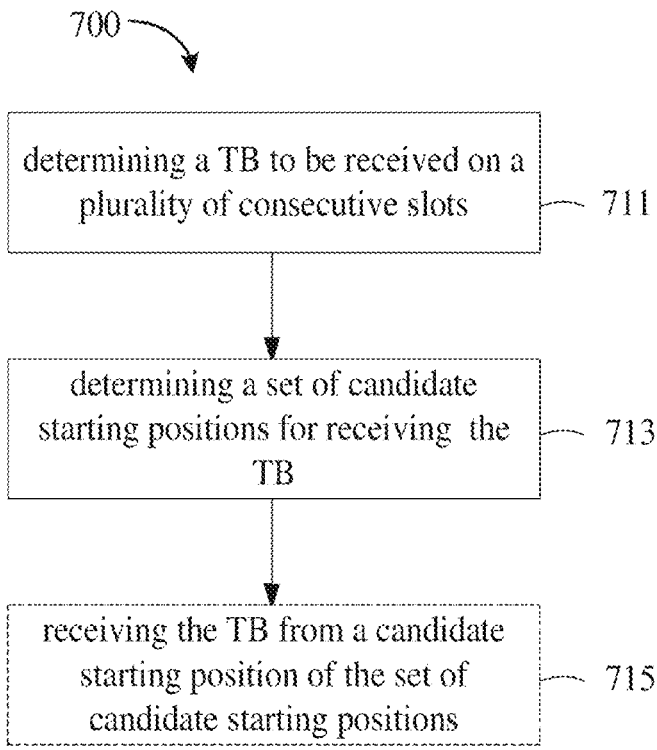
FIG. 7 illustrates a flow chart of an exemplary procedure of wireless communications in accordance with some embodiments of the present disclosure.

FIG. 7 illustrates a flow chart of an exemplary procedure 700 for wireless communications in accordance with some embodiments of the present disclosure. Details described in all of the foregoing embodiments of the present disclosure are applicable for the embodiments shown in FIG. 7. In some examples, the procedure may be performed by a UE, for example, UE 101 in FIG. 1. In some other examples, the procedure may be performed by a BS, for example, BS 102 in FIG. 1.

Referring to FIG. 7, in operation 711, a receiving party (e.g., a UE or a BS) may determine a TB to be received on a plurality of consecutive slots. In some examples, the receiving party may be a UE. For instance, the UE may receive a DCI format for scheduling the TB on the plurality of consecutive slots. The TB may be carried on a PDSCH. In some other examples, the receiving party may be a BS. For instance, the BS may transmit a DCI format for scheduling the TB on the plurality of consecutive slots. The TB may be carried on a PUSCH.

The TB may include a plurality of CBs, which may be mapped to the plurality of consecutive slots. In some embodiments of the present disclosure, each of the plurality of consecutive slots may include an integer number of CBs of the plurality of CBs and an approximately equal number of CBs of the plurality of CBs. The transmitting party may apply a CB mapping scheme to satisfy the above requirements. For example, mapping schemes A1-A4 as described above may apply here.

In some embodiments, assuming that the number of slots of the plurality of consecutive slots is N and the number of CBs in the TB is C, each of X slots of the plurality of consecutive slots may include B CBs and each of Y slots of the plurality of consecutive slots may include A CBs, wherein the values of X, Y, A and B may be determined according to above-mentioned equations (1)-(4).

In some examples, when mapping scheme A1 is applied, the X slots may be the first X slots of the plurality of consecutive slots and the Y slots may be the last Y slots of the plurality of consecutive slots. In some examples, when mapping scheme A2 is applied, the Y slots may be the first Y slots of the plurality of consecutive slots and the X slots may be the last X slots of the plurality of consecutive slots. In some examples, when mapping scheme A3 is applied, the Y slots may be the first Y−1 slots of the plurality of consecutive slots and the last slot of the plurality of consecutive slots, and the X slots may be the remaining slots of the plurality of consecutive slots.

In some examples, when mapping scheme A4 is applied, the plurality of CBs of the scheduled TB may thus be mapped to the plurality of consecutive slots in a dynamic manner. For instance, the DCI format may indicate the mapping scheme (e.g., one of mapping schemes A1-A4) to be applied, for example, via a TDRA indicator.

For example, in response to the first slot of the plurality of consecutive slots being not fully scheduled and the remaining slots of the plurality of consecutive slots being fully scheduled, mapping scheme A2 may be applied. That is, the Y slots may be the first Y slots of the plurality of consecutive slots and the X slots may be the last X slots of the plurality of consecutive slots. In response to the last slot of the plurality of consecutive slots being not fully scheduled and the remaining slots of the plurality of consecutive slots being fully scheduled, mapping scheme A1 may be applied. That is, the X slots may be the first X slots of the plurality of consecutive slots and the Y slots may be the last Y slots of the plurality of consecutive slots. In response to both the first slot and the last slot of the plurality of consecutive slots being not fully scheduled, mapping scheme A3 may be applied. That is, the Y slots may be the first Y−1 slots of the plurality of consecutive slots and the last slot of the plurality of consecutive slots, and the X slots may be the remaining slots of the plurality of consecutive slots. In response to all of the plurality of consecutive slots being fully scheduled, any of the mapping schemes A1 to A3 may be applied. That is, the X slots may be the first X slots of the plurality of consecutive slots and the Y slots may be the last Y slots of the plurality of consecutive slots. Or the Y slots may be the first Y slots of the plurality of consecutive slots and the X slots may be the last X slots of the plurality of consecutive slots. Or the Y slots may be the first Y−1 slots of the plurality of consecutive slots and the last slot of the plurality of consecutive slots, and the X slots may be the remaining slots of the plurality of consecutive slots.

In operation 713, the receiving party may determine a set of candidate starting positions for receiving the TB. In some embodiments, the number of candidate starting positions in the set of candidate starting positions may be equal to the number of slots of the plurality of consecutive slots. For example, a first candidate starting position of the set of candidate starting positions may correspond to the first scheduled symbol (e.g., symbol 221 in FIG. 2) of a first slot of the plurality of consecutive slots, and the remaining candidate starting positions of the set of candidate starting positions may correspond to the first symbols (e.g., symbol 0) of the remaining slots of the plurality of consecutive slots.

In operation 715 (denoted by dotted block as an option), the receiving party may receive the TB from a candidate starting position of the set of candidate starting positions. For example, referring back to FIG. 2, in the case that the transmitting party successfully performs a channel access procedure for a candidate starting position corresponding to symbol 0 in slot n+1, the receiving party may start receiving the TB from symbol 0 in slot n+1.

In some embodiments, when the number of slots of the plurality of consecutive slots is greater than the number of slots available for reception from the candidate starting position, only the CBs of the TB mapped to the first one or more slots of the plurality of consecutive slots are received. In some other embodiments, when the number of slots of the plurality of consecutive slots is greater than the number of slots available for reception from the candidate starting position, only the CBs of the TB mapped to the last one or more slots of the plurality of consecutive slots are received.

For example, referring back to FIG. 2, in the case that the receiving party starts receiving the TB from symbol 0 in slot n+1, the receiving party may only receive the CBs of the TB mapped to the first three slots (e.g., slots n to slots n+2). The CBs of the TB mapped to the last slot (e.g., slot n+3) are dropped since there are only three available slots. Alternatively, the receiving party may only receive the CBs of the TB mapped to the last three slots (e.g., slots n+1 to slots n+3). The CBs of the TB mapped to the first slot (e.g., slot n) are dropped.

In some embodiments of the present disclosure, CBG-based retransmission may be employed. As described above, different CBG construction methods may be applied. In some examples, all the CBs of the scheduled TB included in the same slot are grouped as a CBG. The DCI format may include a bitmap to indicate the CBGs to be transmitted or retransmitted, and each bit of the bitmap may correspond to a respective CBG. The number of bits of the bitmap may be equal to the maximum number of slots scheduled by a DCI format. For instance, referring back to FIG. 2, the CBs of TB 213 mapped to slot n are grouped as a CBG, the CBs of TB 213 mapped to slot n+1 are grouped as another CBG, and so on. DCI format 211 may include a bitmap having 4 bits, each corresponding to a respective CBG. The bitmap may indicate the CBGs of TB 213 to be transmitted or retransmitted.

For example, in response to receiving the TB carried by a PDSCH, the receiving party (e.g., a UE) may generate a HARQ-ACK codebook including HARQ-ACK feedback corresponding to each CBG (or each scheduled slot) of the TB. For example, when the UE successfully decodes all the CBs of a scheduled slot, the UE may generate an ACK corresponding to the slot in the HARQ-ACK codebook. Otherwise, the UE may generate a NACK corresponding to the slot in the HARQ-ACK codebook. In the case that the receiving party is a BS, the bitmap in a DCI format scheduling an initial transmission of a PUSCH may indicate all the CBGs need to be transmitted. When the BS fails to decode any CB of a scheduled slot, the BS may transmit another DCI format to the UE to schedule the retransmission of the PUSCH. The bitmap in the DCI format may indicate the CBGs need to be retransmitted by the UE.

In some other examples, the CBG construction may be based on the maximum number of CBGs per TB, which may be configured by RRC signaling or is predefined. For example, in the case that the procedure 700 is performed by a UE, the UE may receive, from the transmitting party (e.g., a BS), an RRC signaling message indicating the maximum number of CBGs per TB. In the case that the procedure 700 is performed by a BS, the BS may transmit, to the transmitting party (e.g., a UE), an RRC signaling message indicating the maximum number of CBGs per TB. In some examples, the maximum number of CBGs per TB may be predefined. Each of the plurality of consecutive slots may include an integer number of CBGs.

In some cases, the channel access procedures for all candidate starting positions may fail, the transmission of the scheduled TB may be dropped, and thus operation 715 may be eliminated.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
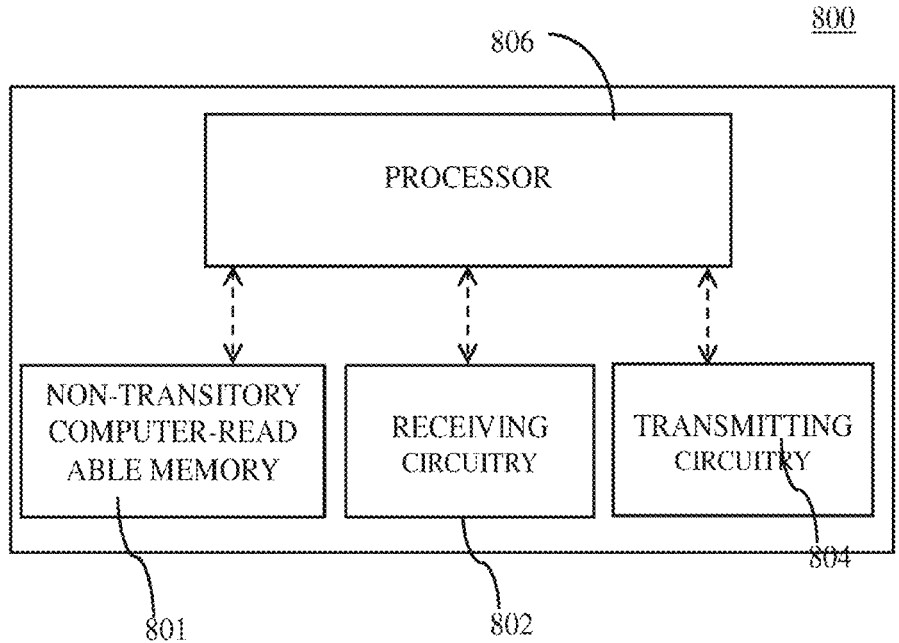
FIG. 8 illustrates a block diagram of an exemplary apparatus in accordance with some embodiments of the present disclosure.

FIG. 8 illustrates a block diagram of an exemplary apparatus 800 according to some embodiments of the present disclosure.

As shown in FIG. 8, the apparatus 800 may include at least one non-transitory computer-readable medium 801, at least one receiving circuitry 802, at least one transmitting circuitry 804, and at least one processor 806 coupled to the non-transitory computer-readable medium 801, the receiving circuitry 802 and the transmitting circuitry 804. The apparatus 800 may be a base station side apparatus (e.g., a BS) or a communication device (e.g., a UE).

Although in this figure, elements such as the at least one processor 806, transmitting circuitry 804, and receiving circuitry 802 are described in the singular, the plural is contemplated unless a limitation to the singular is explicitly stated. In some embodiments of the present application, the receiving circuitry 802 and the transmitting circuitry 804 are combined into a single device, such as a transceiver. In certain embodiments of the present application, the apparatus 800 may further include an input device, a memory, and/or other components.

In some embodiments of the present disclosure, the non-transitory computer-readable medium 801 may have stored thereon computer-executable instructions to cause a processor to implement the method with respect to the UEs as described above. For example, the computer-executable instructions, when executed, cause the processor 806 interacting with receiving circuitry 802 and transmitting circuitry 804, so as to perform the operations with respect to the UEs described in FIGS. 1-7.

In some embodiments of the present disclosure, the non-transitory computer-readable medium 801 may have stored thereon computer-executable instructions to cause a processor to implement the method with respect to the BSs as described above. For example, the computer-executable instructions, when executed, cause the processor 806 interacting with receiving circuitry 802 and transmitting circuitry 804, so as to perform the operations with respect to the BSs described in FIGS. 1-7.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." The wording "the first," "the second" or the like is only used to clearly illustrate the embodiments of the present application, but is not used to limit the substance of the present application.

What is claimed:

1. A method performed by a user equipment (UE) for wireless communication, the method comprising:
    receiving a downlink control information (DCI) format for scheduling a transport block (TB) on a plurality of consecutive slots;
    determining the TB to be transmitted on the plurality of consecutive slots;
    determining a set of candidate starting positions for transmitting the TB, wherein a number of candidate starting positions in the set of candidate starting positions is equal to a number of slots of the plurality of consecutive slots;
    performing a channel access procedure for a candidate starting position from the set of candidate starting positions; and
    transmitting the TB on available slots of the plurality of consecutive slots in response to the channel access procedure being successful.

2. The method of claim 1, wherein a first candidate starting position of the set of candidate starting positions corresponds to a first scheduled symbol of a first slot of the plurality of consecutive slots, and remaining candidate starting positions of the set of candidate starting positions correspond to first symbols of remaining slots of the plurality of consecutive slots.

3. The method of claim 1, wherein the TB comprises a plurality of code blocks (CBs), and each of the plurality of consecutive slots comprises an integer number of CBs of the plurality of CBs and an approximately equal number of CBs of the plurality of CBs.

4. The method of claim 3, wherein when a first number of slots of the plurality of consecutive slots is greater than a second number of the available slots, only the CBs of the TB mapped to a first one or more slots of the plurality of consecutive slots are transmitted; or
    only the CBs of the TB mapped to a last one or more slots of the plurality of consecutive slots are transmitted.

5. The method of claim 3, wherein all the CBs included in a same slot are grouped as a code block group (CBG).

6. The method of claim 5, wherein a downlink control information (DCI) format includes a bitmap to indicate one or more CBGs to be retransmitted or transmitted, and each bit of the bitmap corresponds to a respective CBG, and wherein a number of bits of the bitmap is equal to a maximum number of the slots scheduled by the DCI format.

7. The method of claim 3, wherein each of the plurality of consecutive slots includes an integer number of code block groups (CBGs), and a maximum number of CBGs per TB is configured by radio resource control (RRC) signaling or is predefined.

8. A user equipment (UE) for wireless communication, comprising:
    at least one memory; and
    at least one processor coupled with the at least one memory and configured to cause the UE to:
    receiving a downlink control information (DCI) format for scheduling a transport block (TB) on a plurality of consecutive slots;
    determine the TB to be transmitted on the plurality of consecutive slots;
    determine a set of candidate starting positions for transmitting the TB, wherein a number of candidate starting positions in the set of candidate starting positions is equal to a number of slots of the plurality of consecutive slots;
    perform a channel access procedure for a candidate starting position from the set of candidate starting positions; and
    transmit the TB on available slots of the plurality of consecutive slots in response to the channel access procedure being successful.

9. The UE of claim 8, wherein a first candidate starting position of the set of candidate starting positions corresponds to a first scheduled symbol of a first slot of the plurality of consecutive slots, and remaining candidate starting positions of the set of candidate starting positions correspond to first symbols of remaining slots of the plurality of consecutive slots.

10. The UE of claim 8, wherein the TB comprises a plurality of code blocks (CBs), and each of the plurality of consecutive slots comprises an integer number of CBs of the plurality of CBs and an approximately equal number of CBs of the plurality of CBs.

11. The UE of claim 10, wherein the at least one processor is configured to cause the UE to transmit the TB on available slots of the plurality of consecutive slots in response to the channel access procedure being successful.

12. The UE of claim 11, wherein when a first number of slots of the plurality of consecutive slots is greater than a second number of the available slots,
    only the CBs of the TB mapped to a first one or more slots of the plurality of consecutive slots are transmitted; or
    only the CBs of the TB mapped to a last one or more slots of the plurality of consecutive slots are transmitted.

13. The UE of claim 10, wherein all the CBs included in a same slot are grouped as a code block group (CBG).

14. The UE of claim 13, wherein:
    a downlink control information (DCI) format includes a bitmap to indicate one or more CBGs to be retransmitted or transmitted, and each bit of the bitmap corresponds to a respective CBG; and
    a number of bits of the bitmap is equal to a maximum number of the slots scheduled by the DCI format.

15. The UE of claim 10, wherein each of the plurality of consecutive slots includes an integer number of code block groups (CBGs), and a maximum number of CBGs per TB is configured by radio resource control (RRC) signaling or is predefined.

16. A method performed by a base station (BS), the method comprising:

transmitting a DCI format for scheduling a transport block (TB) on a plurality of consecutive slots;

determining the TB to be received on the plurality of consecutive slots;

determining a set of candidate starting positions for receiving the TB, wherein a number of candidate starting positions in the set of candidate starting positions is equal to a number of slots of the plurality of consecutive slots;

receiving the TB from a candidate starting position of the set of candidate starting positions; and receiving the TB on available slots of the plurality of consecutive slots when a user equipment (UE) channel access procedure is successful.

17. The method of claim 16, wherein a first candidate starting position of the set of candidate starting positions corresponds to a first scheduled symbol of a first slot of the plurality of consecutive slots, and remaining candidate starting positions of the set of candidate starting positions correspond to first symbols of remaining slots of the plurality of consecutive slots.

18. The method of claim 16, wherein the TB comprises a plurality of code blocks (CBs), and each of the plurality of consecutive slots comprises an integer number of CBs of the plurality of CBs and an approximately equal number of CBs of the plurality of CBs.

19. A base station for wireless communication, comprising:

at least one memory; and at least one processor coupled with the at least one memory and configured to cause the base station to:

transmit a DCI format for scheduling a transport block (TB) on a plurality of consecutive slots;

determine the TB to be received on the plurality of consecutive slots;

determine a set of candidate starting positions for receiving the TB, wherein a number of candidate starting positions in the set of candidate starting positions is equal to a number of slots of the plurality of consecutive slot;

receive the TB from a candidate starting position of the set of candidate starting positions; and receiving the TB on available slots of the plurality of consecutive slots when a user equipment (UE) channel access procedure is successful.

20. The base station of claim 19, wherein a first candidate starting position of the set of candidate starting positions corresponds to a first scheduled symbol of a first slot of the plurality of consecutive slots, and remaining candidate starting positions of the set of candidate starting positions correspond to first symbols of remaining slots of the plurality of consecutive slots.

* * * * *